United States Patent
Yamanaka et al.

(10) Patent No.: US 7,068,526 B2
(45) Date of Patent: Jun. 27, 2006

(54) PWM INVERTER DEVICE

(75) Inventors: Katsutoshi Yamanaka, Fukuoka (JP); Jun-Koo Kang, Fukuoka (JP); Shinya Morimoto, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 35 days.

(21) Appl. No.: 10/508,084

(22) PCT Filed: Mar. 18, 2003

(86) PCT No.: PCT/JP03/03267

§ 371 (c)(1),
(2), (4) Date: Sep. 16, 2004

(87) PCT Pub. No.: WO03/079531

PCT Pub. Date: Sep. 25, 2003

(65) Prior Publication Data

US 2005/0128777 A1    Jun. 16, 2005

(30) Foreign Application Priority Data

Mar. 20, 2002  (JP) .............................. 2002-078452

(51) Int. Cl.
    *H02M 5/24* (2006.01)
(52) U.S. Cl. ......................................... 363/98; 363/37
(58) Field of Classification Search ................. 363/34, 363/35, 37, 40, 41, 55, 56.01, 56.02, 95, 363/97, 98, 131, 132

See application file for complete search history.

(56) References Cited

U.S. PATENT DOCUMENTS

| 5,153,821 | A  |   | 10/1992 | Blasko |
|-----------|----|---|---------|--------|
| 5,250,890 | A  | * | 10/1993 | Tanamachi et al. ......... 318/811 |
| 5,790,396 | A  | * | 8/1998  | Miyazaki et al. ............. 363/96 |
| 6,690,593 | B1 | * | 2/2004  | Kimura et al. ................ 363/98 |
| 6,704,212 | B1 | * | 3/2004  | Furukawa et al. ............ 363/41 |
| 6,842,354 | B1 | * | 1/2005  | Tallam et al. ................. 363/98 |

FOREIGN PATENT DOCUMENTS

| JP | 4-133667 A    | 5/1992 |
|----|---------------|--------|
| JP | 10-257782 A   | 9/1998 |
| JP | 2001-218479 A | 8/2001 |

\* cited by examiner

*Primary Examiner*—Gary L Laxton
(74) *Attorney, Agent, or Firm*—Sughrue Mion, PLLC (57) ABSTRACT

A PWM inverter with a PWM pulse output. The PWM pulse signal is output upon magnitude comparison of phase voltage commands with a carrier wave of a triangular or a saw-tooth waveform. A maximum phase whose absolute value is a maximum among absolute values of phases of the phase voltage commands is selected. In a case where the phase voltage commands of the maximum phase are larger than a maximum value of the carrier wave. A difference obtained from a first subtraction of the maximum value of the carrier wave from phase voltage commands of the maximum phase is set as a first differential. The first differential is subtracted from the phase voltage commands of the respective phases in a second subtraction. The first and second subtraction results are set as phase output voltage commands of the respective phases.

7 Claims, 9 Drawing Sheets

PRIOR ART

FIG. 6

PRIOR ART

FIG. 7

PRIOR ART

FIG. 8

PRIOR ART

FIG. 9

| θ1[deg] | θ11[deg] | Tu | Tv | Tw |
|---|---|---|---|---|
| 0 TO 60 | θ1 | T0 | T1 | T2 |
| 60 TO 120 | 120−θ1 | T1 | T0 | T2 |
| 120 TO 180 | θ1−120 | T2 | T0 | T1 |
| 180 TO 240 | 240−θ1 | T2 | T1 | T0 |
| 240 TO 300 | θ1−240 | T1 | T2 | T0 |
| 300 TO 360 | 360−θ1 | T0 | T2 | T1 |

PRIOR ART

PWM INVERTER DEVICE

TECHNICAL FIELD

The present invention relates to an inverter servo drive which drives a motor at variable speeds and to a PWM inverter which interconnects systems.

BACKGROUND ART

Figure 5:
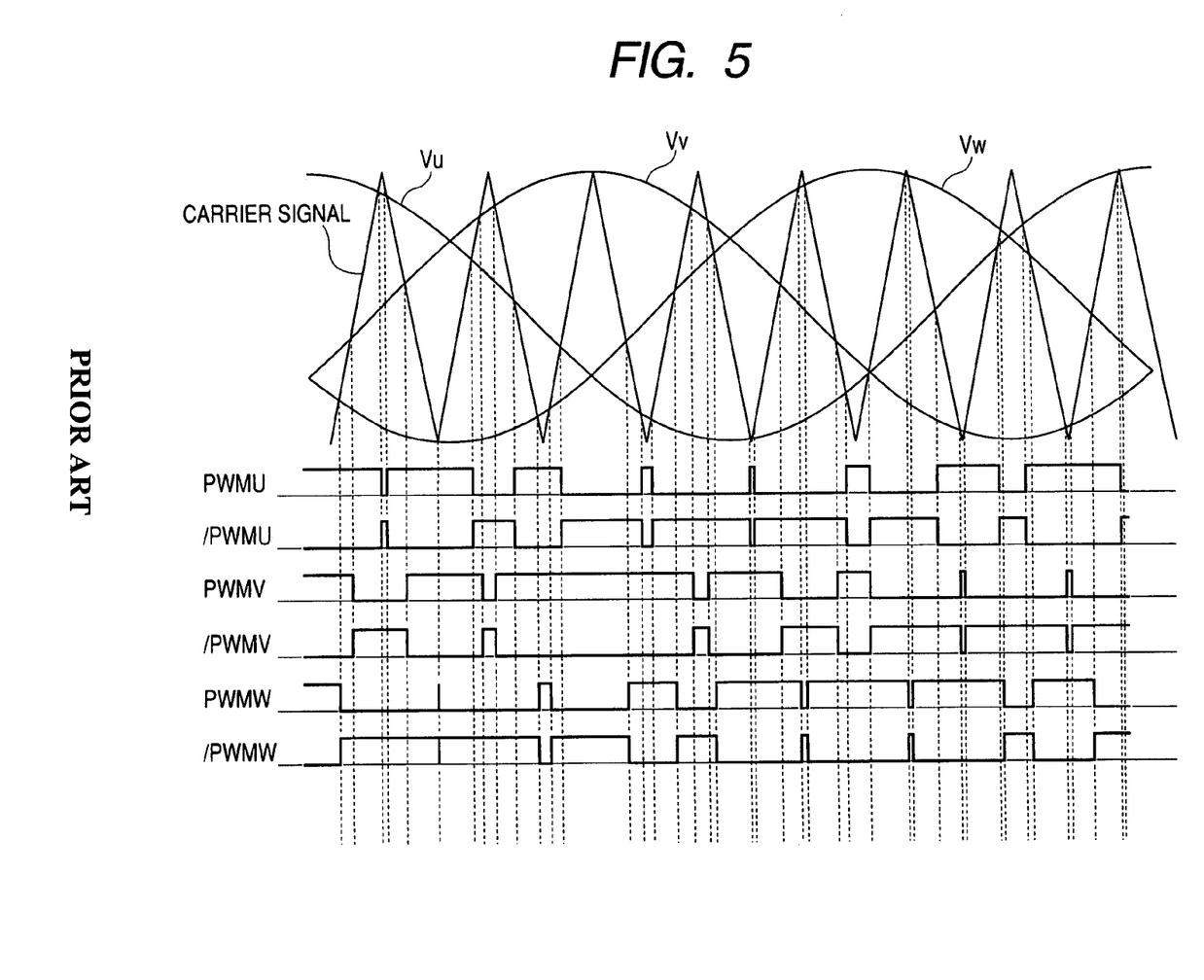
FIG. 5 shows a conventional general method for generating a PWM pulse signal.

In relation to a PWM inverter which outputs an arbitrary sinusoidal voltage by means of activation/deactivation of an IGBT or the like, there are proposed some signal generating methods for a PWM pulse signal which can serve as a command to activate/deactivate an IGBT or the like. One is a method such as illustrated in FIG. 5, where a PWM pulse signal is generated upon comparison between output voltage commands and a triangular wave (carrier wave) (a triangular wave comparison PWM method), and another is a method where a desired PWM pulse signal is generated by composition of vectors in accordance with a space vector concept (a space vector PWM method). A maximum line voltage (amplitude value) which can be output under the triangular-comparison method using output voltage commands of sinusoidal wave is generally limited to $\sqrt{3}/2$ times a direct current bus voltage of the PWM inverter.

However, a maximum line voltage (amplitude value) which can be output under the space vector PWM method coincides with a direct current bus voltage of the PWM inverter. In both of these methods, a maximum output line voltage assumes a sinusoidal waveform.

However, some applications require a larger output voltage, wherein a line output voltage does not necessarily assume a sinusoidal waveform.

Figure 6:
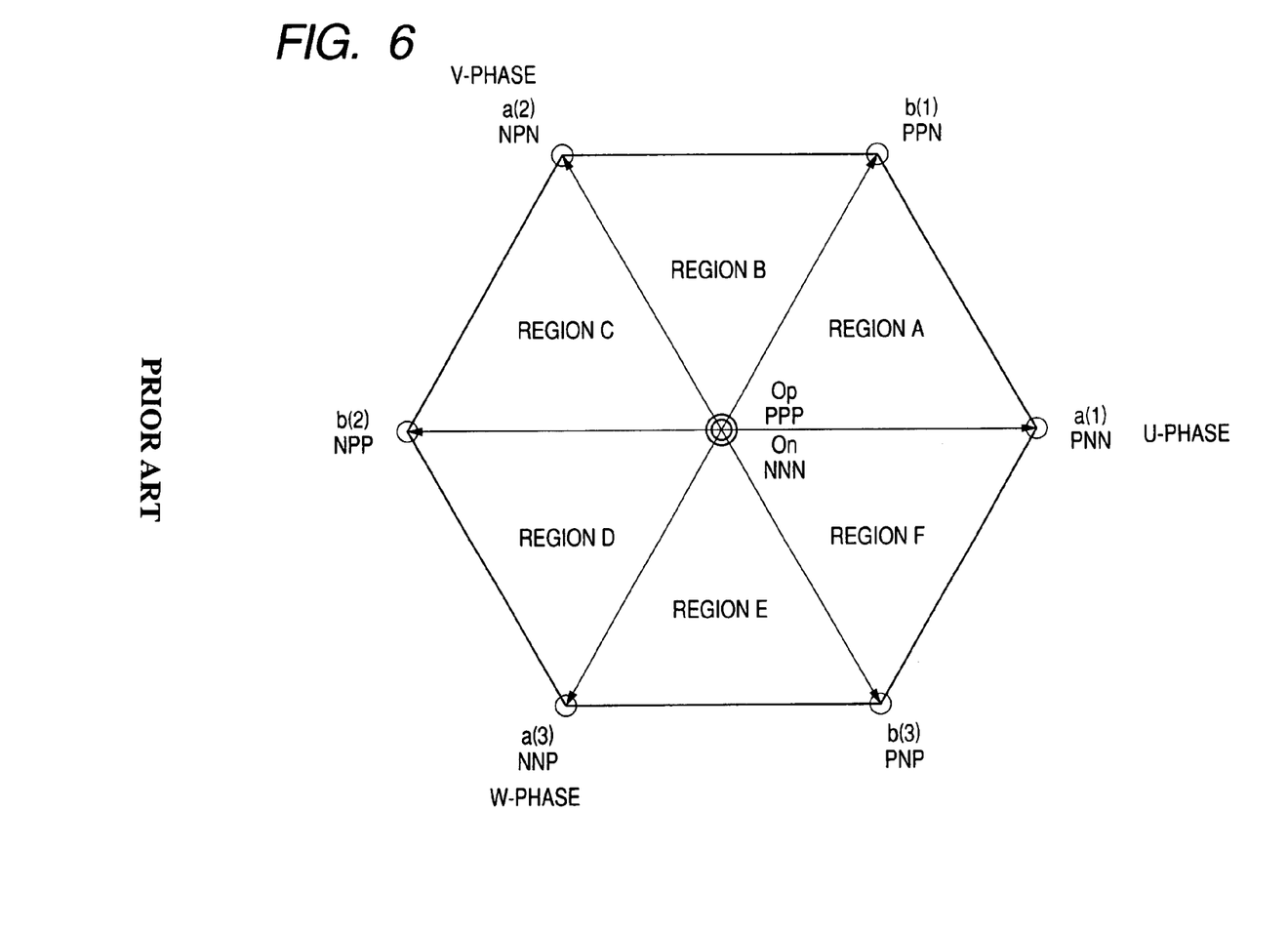
FIG. 6 shows a first related art example showing a six-step voltage output according to a concept of space vector.

A first related art example includes a method for outputting a six-step voltage (a(1) through a(3), and b(1) through b(3) in FIG. 6) positioned at vertexes of a hexagon shown in FIG. 6 when an output voltage exceeds a maximum voltage that can be attained with a sinusoidal voltage.

Figure 7:
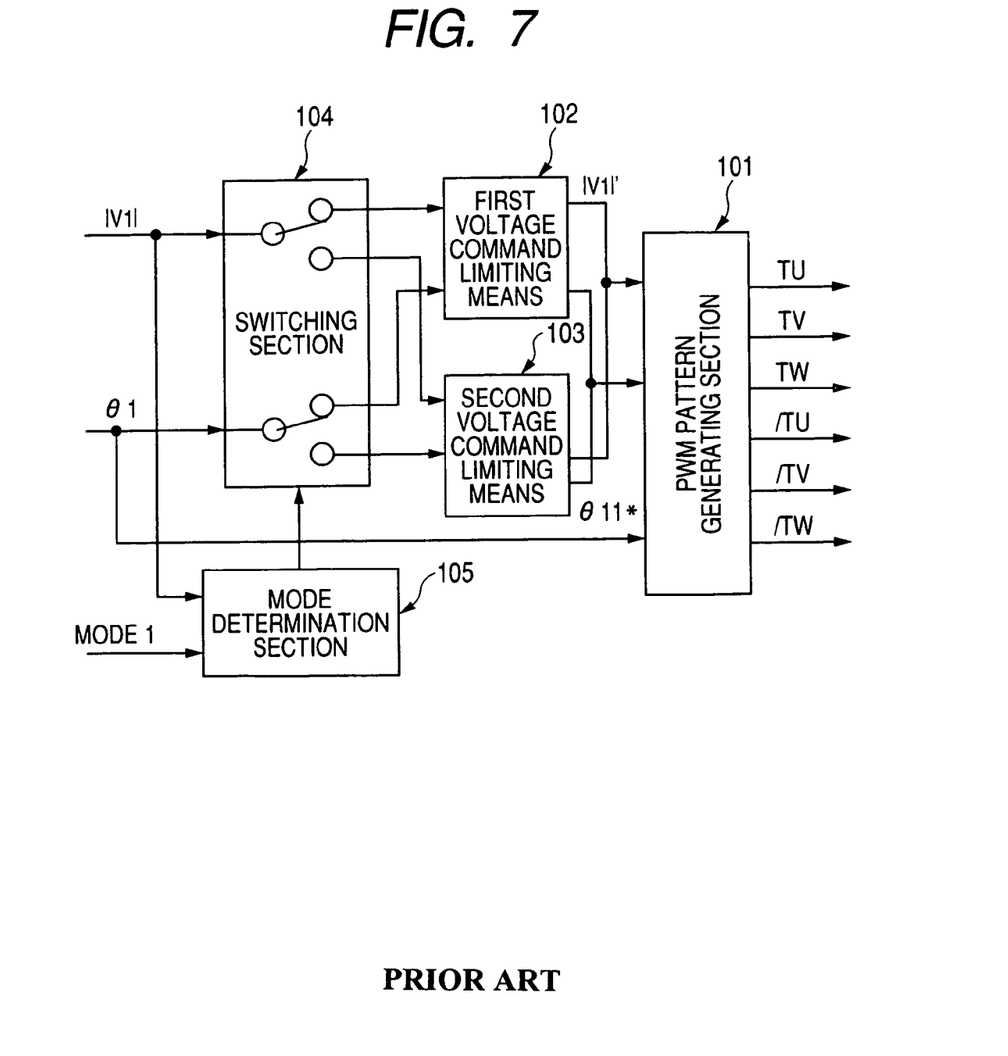
FIG. 7 is a block diagram showing a configuration of a second related art example.
Figure 9:
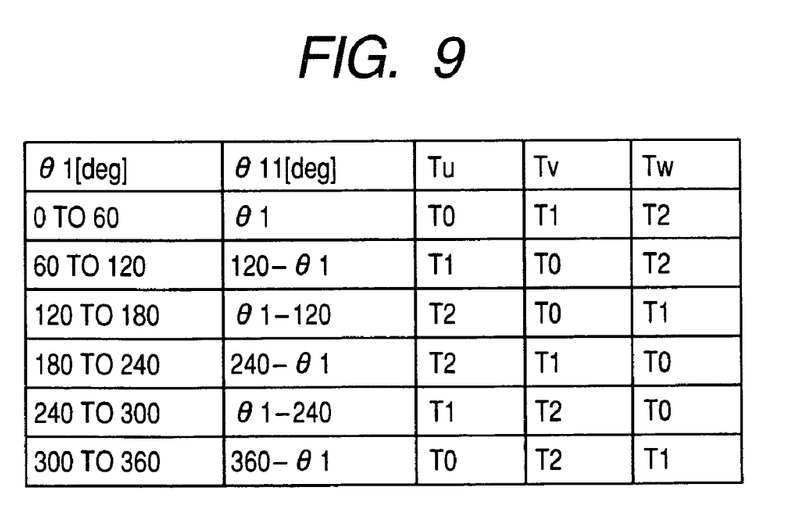
FIG. 9 is a diagram showing functions within a PWM calculating section of a second related art example.

A second related art example is described in, for example, JP-A-10-257782, and is illustrated in FIG. 7. In FIG. 7, 101 denotes a PWM pattern generating section, 104 a voltage-command-limiting-value switching section, 102 first voltage command limiting means, 103 second voltage command limiting means, and 105 a mode determination section. |V1| is a voltage amplitude command after correction, θ11* is a voltage phase command after correction, and MODE 1 is an output-mode switching signal. The mode determination section 105 always outputs HI when |V1| is lower than Vmax. At this time, the voltage-command-limiting switching section 104 selects the first voltage command limiting means 102. Further, the mode determination section 105 always outputs LO when the mode 1 is LO and |V1| is Vmax or larger. At this time, the voltage-command-limiting switching section 104 selects the second voltage command limiting means 103. In step 2, |V1| and θ1 are input to the first voltage command limiting means 102 or the second voltage command limiting means 103, whereby |V1|" and θ11* are output as corrected values of the voltage amplitude command and the voltage phase command, respectively. These signals |V1|', θ11*, and θ1 are input to the PWM pattern generating section 101, thereby generating an appropriate PWM pattern. Further, in FIG. 9, Tu represents a rise (fall) time of a U-phase PWM signal, Tv represents a rise (fall) time of a V-phase PWM signal, and Tw represents a rise (fall) time of a W-phase PWM signal. The symbol "/" prefixed on the respective phase signals indicates a signal which is the negative of the prefixed signal.

Figure 8:
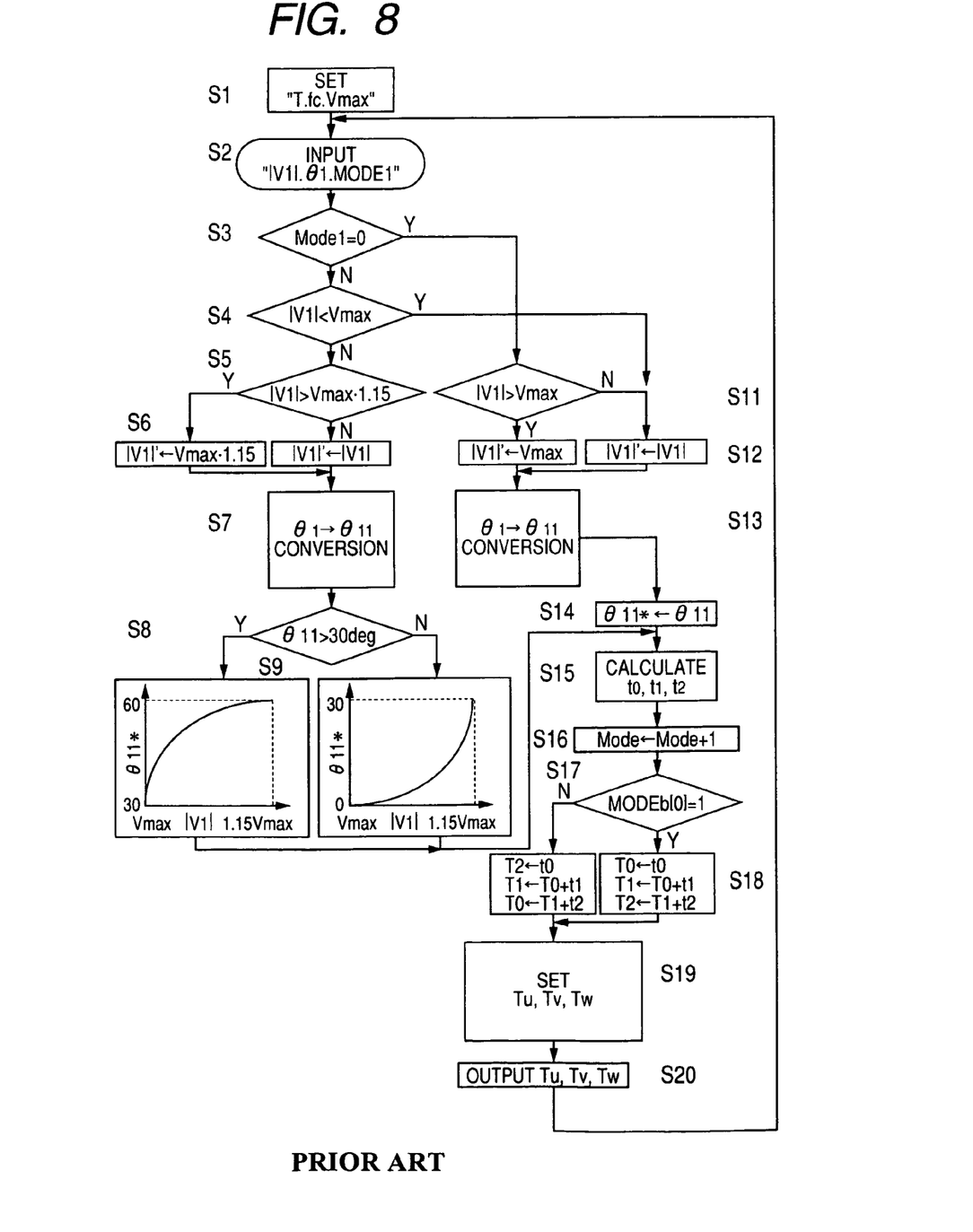
FIG. 8 is flow chart showing a control procedure of a second related art example.

An operation of the second voltage command limiting means will be described by reference to the drawings. FIG. 8 is a flow chart showing a control procedure of an embodiment. In FIG. 8, when "MODE 1=0" holds in step 3 or "|V1|<Vmax" holds in step 4, the first voltage command limiting means 102 is selected; when neither "MODE 1=0" nor "|V1|<Vmax" holds, the second voltage command limiting means 103 is selected. When the second voltage command limiting means 103 is selected, |V1| which has been captured in step 5 is compared with $2/\sqrt{3}\cdot$Vmax. $2/\sqrt{3}\cdot$Vmax is an output voltage at a vertex of the hexagon in FIG. 3, and can be output only when the voltage phase command is 0, 60, 120, 180, 240, 300, or 360. When "|V1|≧$2/\sqrt{3}\cdot$Vmax" holds, "|V1|'=$2/\sqrt{3}\cdot$Vmax" is set in step 6. In all other cases, "|V1|'=|V1|" is set. Next, in step 7, the captured θ1 is converted to a value ranging from 0 to 60 degrees on the basis of a table shown in FIG. 9, and the value is set as θ11.

Next, when "θ11≦30°" holds in step 8, θ11* is determined in step 9 from "θ11*=COS−(Vmax/|V1|)−30°". In an analogous manner, when "θ11>30°" holds, θ11* is determined from "θ11*=COS−(Vmax/|V1|)−30°, and in both cases processing further proceeds to step 15. Next, also in the case where the first voltage command limiting means 102 is selected ("MODE 1=0" in step 3) or the second voltage command limiting means 103 is selected, when |V1| is determined to be smaller than Vmax in step 4, operations during steps 11 to 14 are performed in an analogous manner to the previous steps 5 to 8, thereby reaching step 15. In step 15, t0, t1 and t2 are calculated on the basis of the corrected voltage amplitude command |V1| and the corrected voltage phase command θ11*. In step 16, switching between DOWN mode and UP mode is effected. In steps 17 and 18, DOWN mode or UP mode is detected, thereby setting T0, T1, and T2. In step 19, T0, T1, and T2 are set to TU, TV, and TW with reference to θ1 on the basis of the table shown in FIG. 9. In step 20, TU, TV, and TW are output.

As described above, a line voltage exceeding a direct current bus voltage of the PWM inverter can be output; simultaneously, an intermediate state ranging from a sinusoidal output to an output of six-step voltage (rectangular output) is developed, thereby enabling a smooth transition.

However, as the first related art, an intermediate voltage during a transition from a sinusoidal voltage output to a six-step voltage output cannot be obtained; as a result, there arise problems such that smooth switching between modes is difficult, and that a control characteristic in a current control system, where a current control function is required, becomes unstable during a transitory period of switching.

Further, as the second related art, it has a problem that smooth transition switching to a six-step voltage output requires complicated processing including determination of switching, limitation on lengths of command voltage vectors, or correction of angles of vectors by calculating an arcsine and by reference to a table which stores lengths of vectors and corresponding angles.

The present invention has been conceived to solve the above problems and to provide a PWM inverter which enables smooth mode switching during transition from a sinusoidal voltage output to a six-step voltage output, and which can provide smooth mode switching by means of simple control processing.

DISCLOSURE OF THE INVENTION

In order to solve the above problem, an aspect of the invention is characterized by a PWM inverter having PWM pulse output means for outputting a PWM pulse signal upon magnitude comparison of phase voltage commands with a carrier wave of a triangular or a saw-tooth waveform, wherein:

a maximum phase whose absolute value is the largest among those of the respective phase voltage commands is selected; in the case where a phase voltage command of the maximum phase is larger than a maximum value of the carrier wave, a difference obtained from subtraction of the maximum value of the carrier wave from the phase voltage command of the maximum phase is set as a first differential; the first differential is subtracted from phase voltage commands of the respective phases; and the results of subtraction are set as phase output voltage commands of the respective phases;

in the case where the phase voltage command of the maximum phase is smaller than a minimum value of the carrier wave, a difference obtained from subtraction of the minimum value of the carrier wave from the phase voltage command of said maximum phase is set as a second differential; the second differential is subtracted from phase voltage commands of the respective phases; and these results of subtraction are set as phase output voltage commands of the respective phases;

in other cases, phase voltage commands are set as phase output voltage commands as they are; and the PWM inverter comprises voltage command processing means for outputting the phase output voltage commands to the PWM pulse output means upon input of the phase voltage commands.

By means of the above means, within a range where amplitudes of line voltage commands corresponding to the phase voltage commands are not greater than a direct current bus voltage of the PWM inverter, the line voltage can be output in a sinusoidal wave; and even in the case where the amplitude of the line voltage command exceeds the direct current bus voltage, the line voltage having the direct current bus voltage as an upper limit thereof can be output (in this case, the output voltage is not sinusoidal); accordingly, even a voltage output higher than the direct current bus voltage can be output as an amplitude of the line voltage command (when viewed as an effective value of a fundamental wave component).

In the case of switching to effect transition to a six-step voltage output, smooth transition switching can also be enabled with regard to a voltage amplitude of the phase voltage commands. The reason for this is that there are provided a first region of up to $1/\sqrt{3}$ times a direct current bus voltage (when twice the value of the amplitude of the carrier wave is caused to correspond to the direct current bus voltage, the phase voltage commands is $2/\sqrt{3}$ times the carrier amplitude, and the same applies hereinafter) which is capable of outputting a sinusoidal wave voltage; a third region of $2/\sqrt{3}$ times the direct current bus voltage—where six-step voltage is output—or larger ($4/\sqrt{3}$ times the carrier amplitude or larger); and an intermediate second region thereof.

Further, complicated processing is not required for implementing processing pertaining to the above means, and the above effects can be obtained only by means of simple processing.

Further, a more specific aspect of the invention is characterized in that the PWM inverter includes first voltage conversion means which limits the amplitude of the phase voltage commands to $4/\sqrt{3}$ times the amplitude of the carrier wave when the amplitude of the phase voltage commands is $4/\sqrt{3}$ times an amplitude of the carrier wave or larger.

In the case where the amplitude of the phase voltage commands is $2/\sqrt{3}$ times the direct current bus voltage or larger (the phase voltage commands are $4/\sqrt{3}$ times the carrier amplitude or larger), the line voltage command (instantaneous value) is always equal to or greater than the direct current bus voltage.

Therefore, limitation on the amplitude of the phase voltage commands to $4/\sqrt{3}$ times the amplitude of the carrier wave does not affect an output voltage of the PWM inverter; meanwhile, simplification of processing or the like in accordance with the above limitation enables an instantaneous response from a large voltage command to a small voltage command.

Further, a more specific aspect of the invention is characterized in that the PWM inverter includes second voltage conversion means which limits the amplitudes of the phase voltage commands to a predetermined value of $4/\sqrt{3}$ times the amplitude of the carrier wave or larger when the amplitudes of the phase voltage commands are $4/\sqrt{3}$ times an amplitude of the carrier wave or larger.

Even in the case where the amplitudes of the phase voltage commands are limited to a predetermined value of $4/\sqrt{3}$ times the amplitude of the carrier wave or larger, can be obtained.

Further, a more specific aspect of the invention is characterized in that the PWM inverter includes third voltage conversion means which converts the phase voltage commands to values obtained from multiplication of the phase voltage commands by $\sqrt{3}$ when the amplitudes of the phase voltage commands are $2/\sqrt{3}$ times an amplitude of the carrier wave or larger.

A six-step voltage which serves as a maximum line voltage of the PWM inverter is $2/\sqrt{3}$ times a direct current bus voltage (when viewed as an amplitude value of a fundamental wave component). Therefore, in the case where a six-step voltage output is enabled when voltage amplitudes of the line voltage commands in accordance with the phase voltage commands are $2\sqrt{3}$ times the direct current bus voltage or larger; in other words, when the phase voltage commands (amplitude values) are 2/3 times the direct current bus voltage (the phase voltage commands are 4/3 times the carrier wave amplitude), the PWM inverter can output voltages which follow command voltages.

Because a six-step voltage output can be achieved when the phase voltage commands (amplitude values) are $4/\sqrt{3}$ times the amplitude of the carrier wave or larger, in order to obtain a six-step voltage output under phase voltage commands whose values are 4/3 times the carrier wave amplitude, the only requirement is to set as phase voltage commands values obtained by multiplication of the phase voltage commands by $\sqrt{3}$. Meanwhile, such voltage conversion processing is performed only within a region where output of a sinusoidal voltage is impossible; in other words, a region where the amplitudes of the phase voltage commands are $2/\sqrt{3}$ times the amplitude of the carrier wave or larger.

Further, another aspect of the invention is characterized in that first and third voltage conversion means, or second and third voltage conversion means, are formed from voltage conversion means 1, which is set as fourth voltage conversion means.

Further, a more specific aspect of the invention is characterized in that the first voltage conversion means of the PWM inverter limits the amplitude of the phase voltage commands to $4/\sqrt{3}$ times the amplitude of the carrier wave when the amplitudes of the line voltage obtained from the phase voltage commands are four times an amplitude of the carrier wave or larger.

Because the line voltage is $\sqrt{3}$ times the phase voltage, with regard to the PWM inverter where the amplitude of the phase voltage commands is used as a determination reference, an object of determination has been changed to the line voltage, and the determination reference has been increased by a factor of $\sqrt{3}$.

Further, a more specific aspect of the invention is characterized in that the second voltage conversion means of the PWM inverter limits the amplitude of the phase voltage commands to a predetermined value of $4/\sqrt{3}$ times the amplitude of the carrier wave or larger when the amplitude of the line voltage obtained from the phase voltage commands is four times an amplitude of the carrier wave or larger.

Further, a more specific aspect of the invention is characterized in that the third voltage conversion means of the PWM inverter converts the phase voltage values into values obtained from multiplication of the phase voltage values by $\sqrt{3}$ when the amplitude of the line voltage obtained from the phase voltage commands is two times an amplitude of the carrier wave or larger.

Meanwhile, among reference numerals in drawings, 1 denotes a voltage command shifter, 2 denotes a PWM signal generator, 3 denotes a carrier signal generator, 4 denotes a voltage command limiter, 5 denotes a voltage command multiplier, 11 denotes a commercial power source, 12 denotes a rectifier diode in a converter section, 13 through 18 denote IGBT transistors, 19 through 24 denote circulating diodes, 25 denotes a current detector, 26 denotes an electric motor, 29 denotes a smoothing capacitor, 101 denotes a PWM pattern generation section, 102 denotes a first voltage command limiter, 103 denotes a second voltage command limiter, 104 denotes a voltage-command-limiting-value switching section, and 105 denotes a mode determination section.

BEST MODE FOR CARRYING OUT THE INVENTION

Next, embodiments of the present invention will be described with reference to the drawings.

Figure 1:
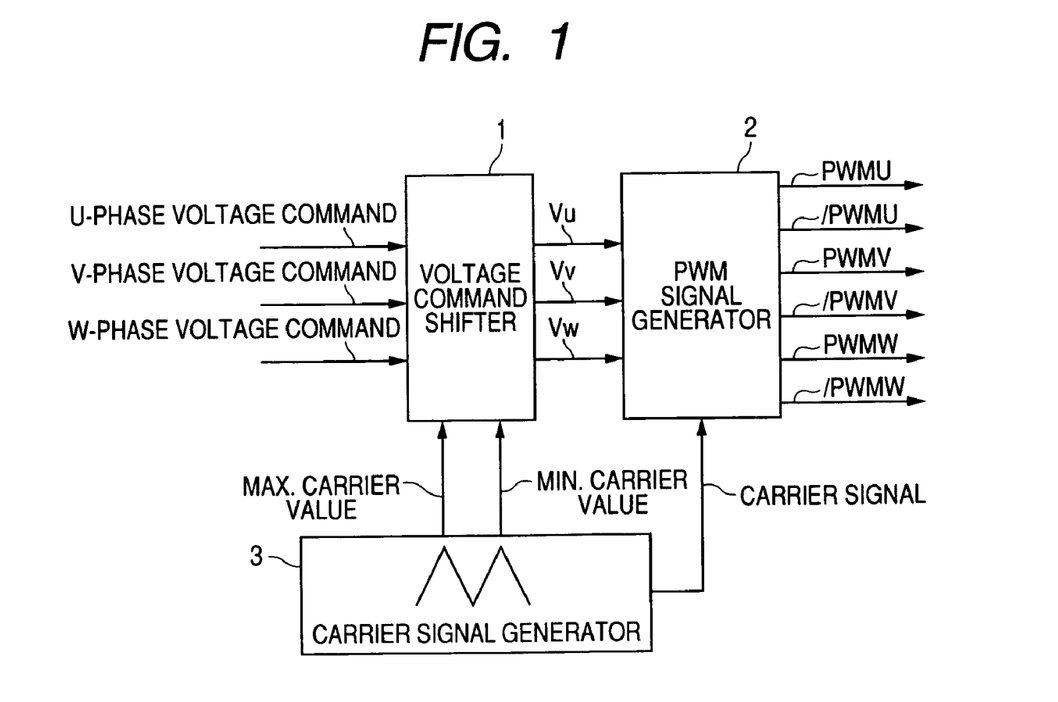
FIG. 1 is a block diagram of a first embodiment of the present invention.

FIG. 1 is a block diagram of a first embodiment of the present invention. 1 denotes a voltage command shifter; 2 denotes a PWM generator; and 3 denotes a carrier signal generator.

When three-phase voltage commands for U-phase, V-phase and W-phase are supplied from a high-level controller, the voltage command shifter 1 compares absolute values (|Vru|, |Vrv|, |Vrw|) of the respective phase voltage commands (Vru, Vrv, Vrw), and selects a voltage command Vrx of a phase having the largest absolute value among the absolute values. Next, magnitudes of a maximum value (Cmax) and a minimum value (Cmin) of carrier signals obtained from the carrier signal generator 3 are compared with Vrx:

(1) When Vrx is smaller than Cmax, and Vrx is larger than Cmin, the respective voltage commands are output as signals (Vu, Vv, and Vw) for the PWM generator 2 as they are;

(2) When Vrx is larger than Cmax, (Vrx−Cmax) is calculated, and the following are output:

Vu=Vru−(Vrx−Cmax), Vv=Vrv−(Vrx−Cmax), and Vw=Vrw−(Vrx−Cmax);

(3) When Vrx is smaller than Cmin, (Vrx−Cmin) is calculated, and the following are output:

Vu=Vru−(Vrx−Cmin), Vv=Vrv−(Vrx−Cmin), and Vw=Vrw−(Vrx−Cmin).

The PWM signal generator 2 compares a carrier wave from the carrier signal generator 3 with Vu, Vv, and Vw, thereby outputting PWM pulses of the respective phases.

By means of the foregoing operations, in the case where amplitude of the phase voltage commands becomes $4/\sqrt{3}$ times an amplitude of the carrier signals, and pulses generated by the PWM generator become six-step PWM pulses, automatic switching to six-step PWM can be achieved by merely increasing the amplitude of the phase voltage commands without requiring complicated calculations or special switching.

A sinusoidal wave is generally used for three-phase voltage commands supplied from a high-level controller; however, when a line voltage is designed so as to output a desired voltage, other waveforms may also be employed instead.

Figure 2:
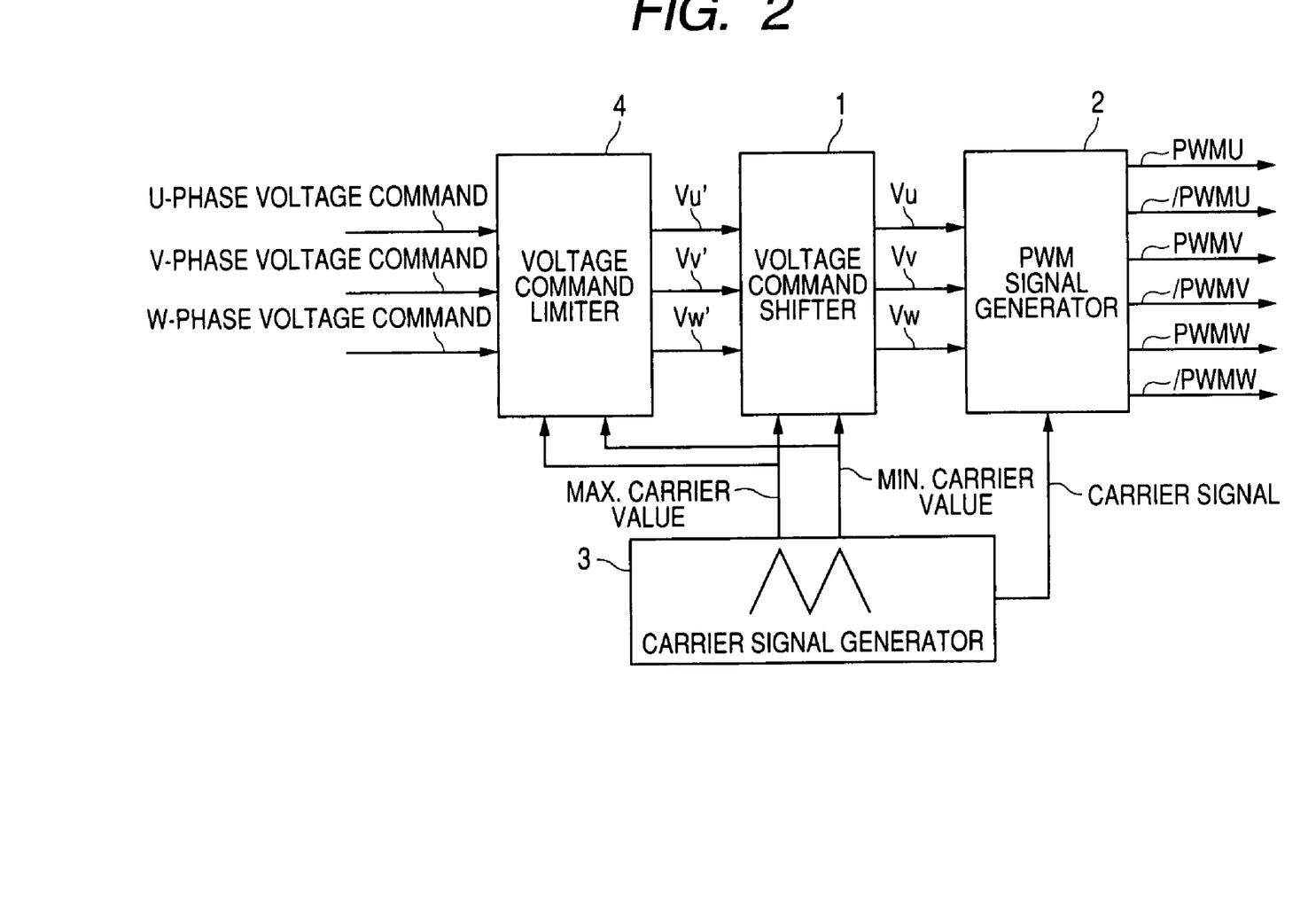
FIG. 2 is a block diagram of a second embodiment of the present invention.

FIG. 2 is a block diagram of a second embodiment of the present invention. 1 denotes a voltage command shifter, 2 denotes a PWM generator, 3 denotes a carrier signal generator, and 4 denotes a voltage command limiter.

When three-phase voltage commands for U-phase, V-phase and W-phase are supplied from a high-level controller, the voltage command limiter 4 obtains a voltage amplitude of the phase voltage commands, and obtains an amplitude of carrier signals from the maximum value and the minimum value of the carrier signals from the carrier signal generator 3; and the amplitude of the phase voltage commands having an upper limit of $4/\sqrt{3}$ times the amplitude of the carrier signals is supplied to the voltage command shifter 1.

Operations of the voltage command shifter 1 and the PWM generator 2 are identical with those of the block diagram in FIG. 1.

When the above limitations are imposed by the high-level controller, the voltage commands can be prevented from becoming excessively large; accordingly, a control response speed of the PWM inverter under a condition where the voltage commands must be decreased rapidly is improved.

In the above, the voltage amplitude of the phase voltage command has been described as being obtained in the voltage command limiter 4; however, there may be adopted a configuration where an amplitude of the phase voltage commands is supplied from a high-level controller to the voltage command limiter 4. Further, no problem arises in integrating the voltage command limiter 4 into the voltage command shifter 1.

Figure 3:
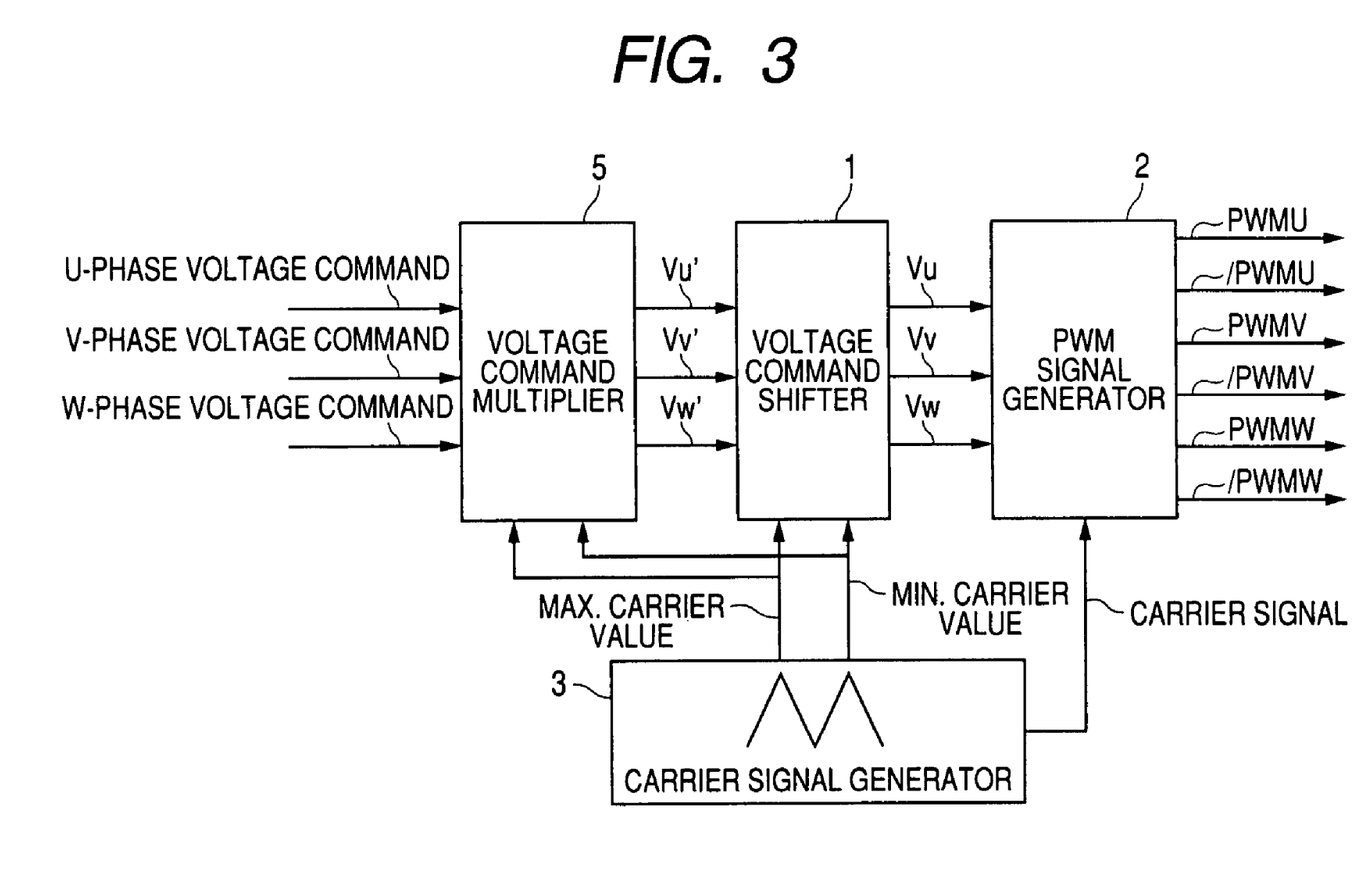
FIG. 3 is a block diagram of a third embodiment of the present invention.
Figure 4:
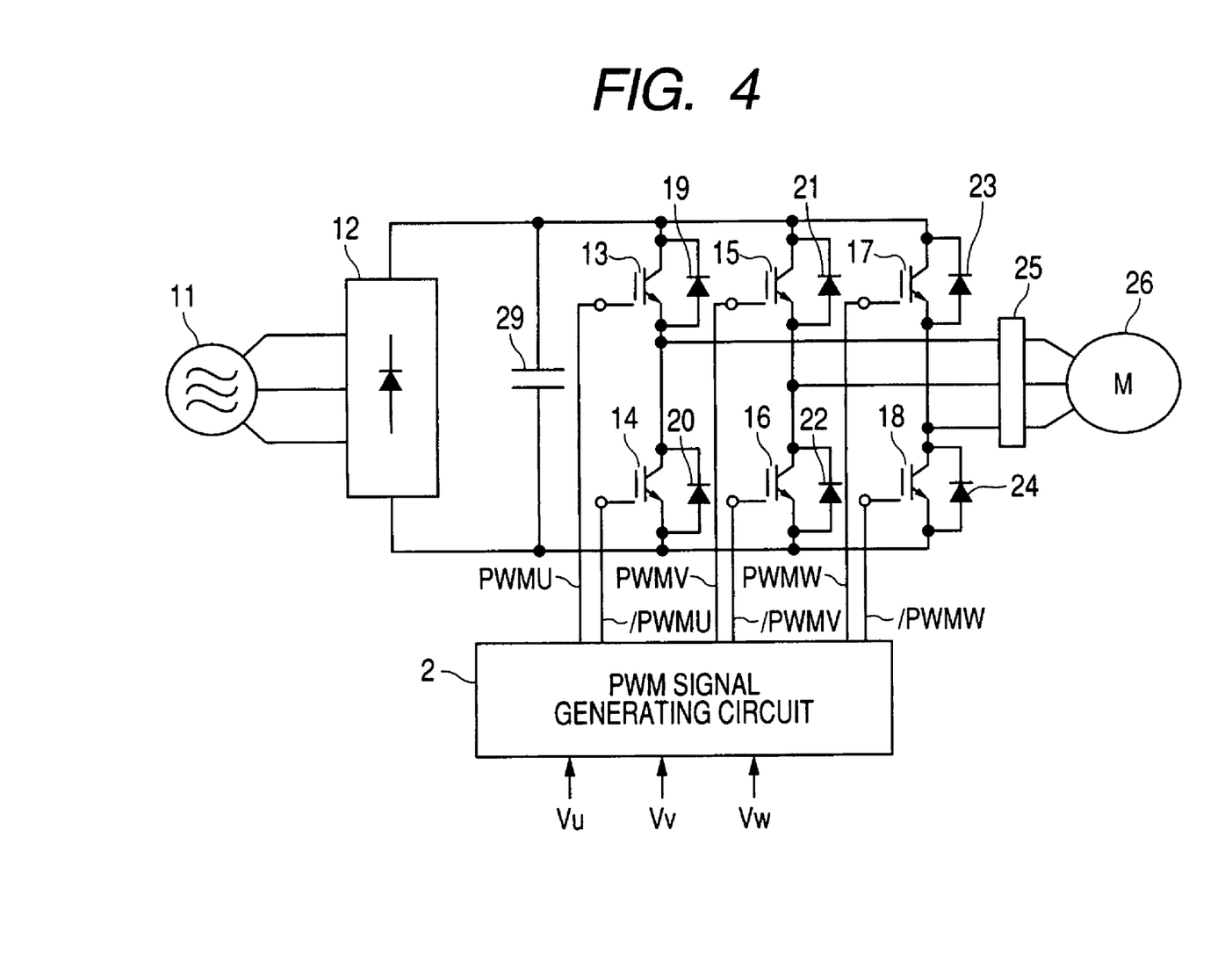
FIG. 4 shows a configuration diagram of a PWM inverter of the present invention.

FIG. 3 is a block diagram of a third embodiment of the present invention. 1 denotes a voltage command shifter, 2 denotes a PWM generator, 3 denotes a carrier signal generator, and 5 denotes a voltage command multiplier.

When three-phase voltage commands for U-phase, V-phase and W-phase are supplied from a high-level controller, the voltage command multiplier 5 obtains an amplitude Vpp of the phase voltage commands, thereby obtaining a maximum carrier signal value Cmax, a minimum value Cmin, and a differential value thereof Cdiff. When the amplitude Vpp of the phase voltage exceeds Cdiff/$\sqrt{3}$, values (Vu', Vv', and Vw')-which are obtained from multiplication of the respective phase voltage command values (Vru, Vrv, and Vrv) by $\sqrt{3}$—are supplied to the voltage command shifter 1.

Operations of the voltage command shifter 1 and the PWM generator 2 are identical with those of the aforementioned block diagram in FIG. 1. Through such operations, linearity of voltage values which are actually output from the PWM inverter and voltage commands is improved.

In the example, multiplication is performed by the voltage command multiplier 5; however, such a multiplication adjustment can be performed elaborately by a high-level controller. When the above is adopted, linearity of voltage values which are actually output from the PWM inverter and voltage commands is further improved.

Further, the voltage command multiplier 5 may be integrated in the voltage command shifter 1.

Furthermore, the second embodiment and the third embodiment can be implemented in a combined manner.

The present invention has been described in detail and with reference to specific embodiments; however, as is apparent to one skilled in the art, various changes and modifications can be adopted without departing form the spirit and scope of the invention.

The present invention is based on Japanese Patent Application filed on Mar. 20, 2002 (Japanese Patent Application No.2002-078452), which is incorporated herein by reference.

INDUSTRIAL APPLICABILITY

As has been described, the present invention provides smooth mode switching during a transition from a sinusoidal voltage output to a six-step voltage output; and even in a current control system where current control function is required, favorable and stable control function can be obtained during the above transition.

Further, with regard to transition switching to a six-step voltage output, the invention does not require complicated processing including determination of switching, limitation on lengths of command voltage vectors, or correction of angles of vectors by calculating an arcsine and using a table which stores lengths of vectors and angles corresponding thereto; and such transition switching can be implemented rapidly through simple processing.

The invention claimed is:

1. A PWM inverter having PWM pulse output means for outputting a PWM pulse signal upon magnitude comparison of phase voltage commands with a carrier wave of a triangular or a saw-tooth waveform, wherein:

a maximum phase whose absolute value is a maximum among the absolute value of the phase voltage commands is selected;

in a first case where the phase voltage command of said maximum phase is larger than a maximum value of said carrier wave, a difference obtained from a first subtraction of said maximum value of said carrier wave from phase voltage command of said maximum phase is set as a first differential; said first differential is subtracted from said phase voltage commands of said respective phases in a second subtraction; and the first and second subtraction results are set as phase output voltage commands of said respective phases;

in a second case where said the phase voltage commands of said maximum phase is smaller than a minimum value of said carrier wave, a difference obtained from a third subtraction of said minimum value of said carrier wave from phase voltage command of said maximum phase is set as a second differential; said second differential is subtracted from said phase voltage commands of said respective phases in a fourth subtraction; and the third and fourth subtraction results are set as phase output voltage commands of said respective phases; and in a case other than said first and second cases, phase voltage commands are set as phase output voltage commands;

the PWM inverter characterized by comprising voltage command processing means for outputting said phase output voltage commands to said PWM pulse output means upon input of phase voltage commands.

2. The PWM inverter according to claim 1, characterized by having first voltage conversion means for limiting an amplitude of said phase voltage commands to 4/$\sqrt{3}$ times the amplitude of said carrier wave when the amplitude of said phase voltage commands is 4/$\sqrt{3}$ times an amplitude of said carrier wave or larger.

3. The PWM inverter according to claim 2, characterized in that, said first voltage conversion means limits the amplitude of said phase voltage commands to 4/$\sqrt{3}$ times an amplitude of said carrier wave when an amplitude of a line voltage obtained from said phase voltage commands becomes four times the amplitude of said carrier wave or larger.

4. The PWM inverter according to claim 1, characterized by having second voltage conversion means for limiting the amplitude of said phase voltage commands to a predetermined value which is 4/$\sqrt{3}$ times an amplitude of said carrier wave or larger when the amplitude of said phase voltage commands is 4/$\sqrt{3}$ times the amplitude of said carrier wave or larger.

5. The PWM inverter according to claim 4, characterized in that said second voltage conversion means limits the amplitude of said phase voltage commands to a predetermined value of 4/$\sqrt{3}$ times the amplitude of said carrier wave or larger when an amplitude of a line voltage obtained from said phase voltage commands becomes four times the amplitude of said carrier wave or larger.

6. The PWM inverter according to claim 1 or 4, characterized by having third voltage conversion means for converting said phase voltage commands to a value obtained from multiplication of said phase voltage commands by $\sqrt{3}$ when the amplitude of said phase voltage commands is 2/$\sqrt{3}$ times the amplitude of said carrier wave or larger.

7. The PWM inverter according to claim 6, characterized in that said third voltage conversion means converts said phase voltage commands into values obtained from multiplication of said phase voltage commands by $\sqrt{3}$ when an amplitude of a line voltage obtained from said phase voltage commands becomes two times the amplitude of said carrier wave or larger.

* * * * *